Dec. 22, 1953 N. INSLEY ET AL 2,663,782

CIRCUIT REGULATING DEVICE

Filed Sept. 12, 1950 4 Sheets-Sheet 1

INVENTORS: N. INSLEY
T.L. TANNER
BY
[signature]
AGENT

Dec. 22, 1953 N. INSLEY ET AL 2,663,782

CIRCUIT REGULATING DEVICE

Filed Sept. 12, 1950 4 Sheets-Sheet 2

INVENTORS: N. INSLEY
T.L. TANNER
BY
S. MacKenzie
AGENT

CIRCUIT REGULATING DEVICE

Filed Sept. 12, 1950 4 Sheets-Sheet 3

INVENTORS: N. INSLEY
T.L. TANNER
BY
[signature]
AGENT

INVENTORS: N. INSLEY
T.L. TANNER
BY
D. MacKenzie
AGENT

Patented Dec. 22, 1953

2,663,782

UNITED STATES PATENT OFFICE 2,663,782

CIRCUIT REGULATING DEVICE

Norman Insley, Nanuet, N. Y., and Theodore L. Tanner, Metuchen, N. J., assignors to Bell Telephone Laboratories, Incorporated, New York, N. Y., a corporation of New York Application September 12, 1950, Serial No. 184,476

3 Claims. (Cl. 201—63)

This invention relates to electrical equalizers, particularly useful in telephonic transmission over lines of various loop lengths.

The invention provides means for rendering substantially uniform the efficiency of telephonic transmission between called and calling parties despite differences in the lengths of the line loops connecting them through a central office.

To provide such means is, therefore, a general object of the invention.

Another general object of the invention is to provide means for equalizing the power supplied to a load device from a power source regardless of the length of the intervening transmission line.

In telephonic transmission of voice currents over lines of varying resistance, from a carbon transmitter to a receiver, it is desirable to minimize the variation in direct current through the transmitter with variation in resistance of the line over which is supplied with current from the central office and at the same time to minimize the corresponding variation in the alternating component of that current flowing through the receiver. The simultaneous control of these variations protects the transmitter from excessive direct current for short loops and the receiver from excessive levels of the voice current component of that current when modulated by voice waves at the transmitter.

A particular object of the invention is, therefore, to protect at the same time the transmitter and the receiver involved in a telephone conversation, from excessive electrical loads.

Since the level of the voice current component is proportional to the direct current which is modulated by the talker's voice, the regulation of telephone transmission to be uniform despite variations in loop length may be accomplished in part by a compensating resistance controlling the direct current from a central battery through the transmitter and in part by shunting from the receiver a fraction, increasing with level, of the voice current supplied to it.

A specific object of the invention is thus to provide means for regulating the level of telephonic transmission to be substantially independent of line length by simultaneously regulating the modulated direct current in the line and the voice current component supplied to the receiver.

Also, it is a specific object of the invention to provide an electrothermal equalizer between a power source and a load device comprising a ballast resistance having a positive temperature coefficient in series therebetween and a resistance having a negative temperature coefficient shunting the load and thermally controlled in resistance by the ballast resistance.

Another particular object of the invention is to provide an equalizer adapted to serve the purposes described which shall be simple to install, easy to manufacture, and capable of quantity production with a minimum of variability due to manufacturing tolerances in the steps of constructing it.

Concretely, in one illustrative embodiment the equalizer of the invention comprises a glass envelope filled with a suitable gas at low pressure containing a filament of coiled resistance wire, tungsten for example, having a positive temperature coefficient of resistance, in proximity to which in the envelope is a thermistor or like element having a negative temperature coefficient of resistance. Externally, the filament is connected in series with the central battery and the transmitter, while the thermistor is connected in shunt to the receiver. It is desirable to place a resistance in series with the thermistor in order to fix a minimum value of the resistance shunting the receiver.

In operation, the filament is heated above ambient temperature by the current through it and the transmitter, and itself heats the thermistor, the resistance of which falls as its temperature rises. The shorter the loop connecting the talker and the listener, the greater the current and so the higher the temperature to which the filament is heated. The filament resistance rises, so to a marked extent, the current variation with variation in loop length is checked; this to the same extent applies to the voice component of the transmitter current.

At the same time the transmitter current is stabilized, the thermistor is heated by radiation and gas conduction of heat from the heated filament, and its resistance correspondingly falls. The effect of this is to shunt the receiver with a resistance which is lower the shorter the loop. The combined effect of filament and thermistor is to secure substantially the same volume of transmitted sound from talker to listener for all loop lengths up to the greatest practically used in the telephone system. At the longest loop, the ballasting of the transmitter direct current and the bleeding from the receiver of voice frequency current are least, thus establishing a sound level which is maintained by the equalizer substantially constant over shorter loops.

It is convenient to protect the filament from damaging voltage surges and the receiver from clicks. Therefore, the filament is shunted by a silicon carbide varistor which limits the voltage across it to some 18 volts, and the receiver is shunted additionally by a copper oxide varistor as a click reducer. The equalizer, including these varistors, appears at each subscriber's station installed in the telephone set.

By "varistor" is meant herein an electrical resistance element of which the resistance is principally determined by the voltage across the element, rapidly decreasing as the voltage exceeds a predetermined value. By "thermistor" is meant an electrical resistance element of which the resistance is principally determined by the temperature of the element, decreasing as this temperature increases.

A system of which the present invention forms a part is disclosed and claimed in the copending application of N. Botsford et al., filed December 22, 1947, Serial No. 793,170, "Subscriber Telephone Set," now Patent 2,620,402, issued December 2, 1952. In that application are disclosed the telephonic requirements and their basis; such requirements are assumed in the description of the present invention.

While telephonic transmission involves powers of only a few watts, obviously with appropriate changes in size and carrying capacity, the elements of the invention could become capable of regulating power transmission, either by direct or alternating current, on a much larger scale.

The invention will be understood from the following description of an illustrative embodiment thereof suited for the regulation of telephonic transmission, read with reference to the accompanying drawings, in which.

In all figures, like elements are given like designations.

Figure 1:
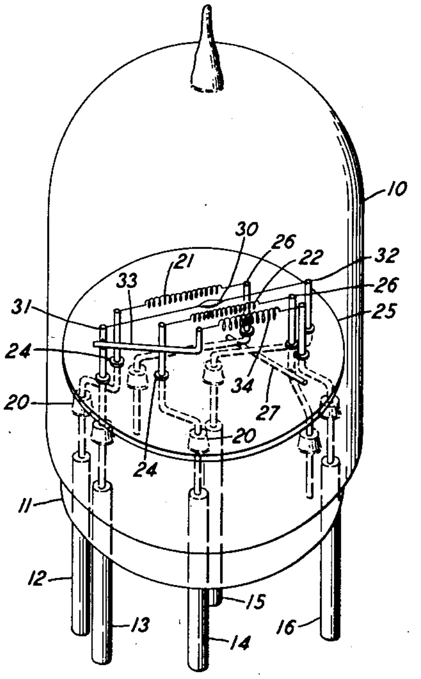
Fig. 1 is a perspective view of one form of the equalizer of the invention, suitable for telephonic purposes.

Referring to Fig. 1, glass envelope 10 is filled with an inert gas, suitably nitrogen, at a pressure of a few millimeters of mercury. Sealed to the bottom of the envelope is a glass stem 11 through which pass conducting pins 12–16 (of which 13 is a locating pin) adapted to be inserted in a socket (not shown) providing connection to the exterior conductors by which the equalizer is included in the substation circuit. Emerging from the glass stem through the embossed portions such as 20—20, pins 12 and 14 are connected to the respective ends of the filament, which is formed in two equal coils 21, 22 parallel to each other and spaced apart horizontally a distance dictated by other parameters of the equalizer, such as gas pressure and turn spacing in each coil. On the way from the press to the filament coils, the connections to pins 12 and 14 pass through eyelets such as 24—24 in a mica disc 25, which in like manner localizes conducting posts 26—26 to which are connected the coil ends remote from the connections to pins 12 and 14. Beneath the mica disc, posts 26 are bent as shown to reach the embossings respectively locating them in press 11 and are electrically joined by a bar 27.

In like manner, thermistor 30 is supported in the plane of and mid-way between coils 21, 22 by conducting posts 31, 32, of which 31 is supported by locating pin 13 and 32 is connected to pin 15. Post 31 is connected by bar 33 to Nichrome resistance wire 34, of 50 ohms resistance, which is connected to pin 16 in the manner described for the connections to pins 12 and 14.

The arrangement described provides that thermistor 30 is equally exposed on each side to heat radiated and conducted from filament coils 21 and 22. The filament circuit, coils 21 and 22 in series, is included between pins 12 and 14; the thermistor circuit, thermistor 30 in series with resistance wire 34, is included between pins 15 and 16.

Resistance wire 34 may be located beneath the mica disc or outside the envelope if more convenient in manufacture, and other configurations of filaments, of pins 12–16 and of supporting posts may be employed.

Dimensionally, in a particular embodiment of the device shown in Fig. 1 which is drawn approximately to scale, envelope 10 was 0.700 inch in diameter. The filament coils 21, 22 were of non-sag tungsten wire; the length of each coil was 0.150 inch, including 125 turns of wire 0.0006 inch diameter, the turns being spaced 0.0012 inch center to center, inside diameter 0.0025 inch. Each coil is "spaced wound," having a substantially straight segment at each end for attachment to the supporting post.

Thermistor 30, 0.030 inch diameter by 0.050 inch long, was a mixture of manganese, nickel, and copper oxides such as is disclosed in United States Patent 2,274,592, granted February 24, 1942, to E. F. Dearborn. Its center was distant 0.075 inch from the center of each filament coil. The filament supports for each coil were spaced apart one-quarter inch, while those of the thermistor were spaced three-eighths inch. The Nichrome resistance 34, when mounted above the mica disc, is exposed to the heat of the filament, but its temperature coefficient is so low that its resistance does not appreciably change. The gas filling found suitable was nitrogen at a pressure in the range of 4 to 6 millimeters of mercury.

The device illustrated in Fig. 1 serves, in its telephonic application, so to equalize transmission among loops of various lengths as to provide essentially no loss on long loops, a maximum predetermined loss on short loops, and a graduated loss on loops of intermediate length. It is possible to establish desired resistance characteristics for the separate elements, filament and thermistor, versus current in the loop to insure the specified progression in transmission between long and short loops. These requirements may be translated into specifications of ranges of resistance values permissible at various values of loop (direct) current. Such specifications, as arrived at in the design of the telephone set disclosed in the above-mentioned patent application of N. Botsford et al., will be assumed in the following description of the adjustment of parameters which makes the equalizer of Fig. 1 adequate for use in that set.

The assumed specifications are for convenience tabulated below.

*Desired filament and thermistor characteristics*

| Filament current, Milliamperes | Filament resistance, ohms | Thermistor plus Nichrome wire resistance, ohms |
|---|---|---|
| 30 | 30 maximum | 800 minimum. |
| 48 | 125 | 225. |
| 60 | 175 | 100. |
| 78 | 228 | 60 minimum. |

Of the above-specified nominal resistance-current data, the filament and thermistor resistances at 48 milliamperes filament current are the most important. Tolerances, at all filament currents, are allowable, in these resistance values and the ranges of acceptable values are indicated on Figs. 5 and 6, later to be described.

Figure 2:
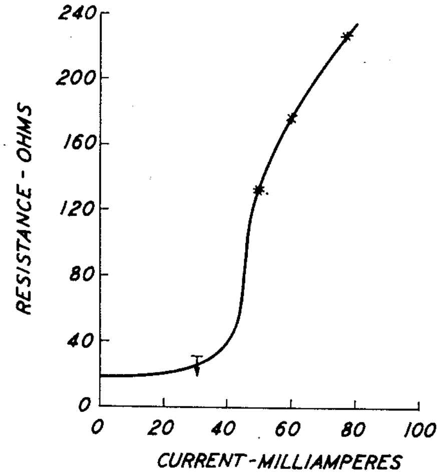
Fig. 2 is a graph of the desired characteristic of filament resistance as a function of filament current.

Referring now to Fig. 2, the graph shows the nominal (desired) curve relating filament resistance to filament current, the specifications of the second column of the above table being indicated by crosses except where a downward pointing arrow indicates the requirement that at 30 milliamperes filament current the filament resistance be not more than 30 ohms.

It will be recalled that the filament is protected from damaging voltage surges by a silicon carbide varistor in parallel with the filament, limiting the voltage to 18 volts maximum. At values of filament current higher than those to be dealt with in telephonic transmission, the varistor drains off a portion of the current otherwise carried by the filament, preventing the rise in filament temperature above a safe operating value.

Figure 3:
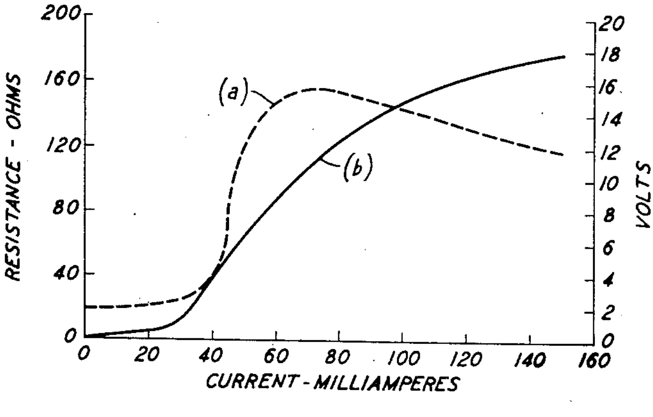
Fig. 3 shows graphs of the desired resistance and voltage characteristics of the filament shunted by the varistor as functions of the total current in the parallel combination.

The curves of Fig. 3 are illustrative of this effect. Here both curves (a) and (b) are plotted against total current in the parallel connection of filament and silicon carbide varistor. Curves (a) and (b) exhibit, respectively, filament resistance and voltage as functions of the total current.

It has already been mentioned that the office of equalization is shared between the filament in series with the telephone line and the thermistor in shunt with the telephone receiver. The shunting effect of the thermistor is controlled by the filament temperature to which the thermistor is exposed, and a minimum such effect is provided for by including the 50 ohm (for example) Nichrome wire in series with the thermistor. On the basis of telephonic practice, a desired characteristic of thermistor resistance (including the 50 ohms additional of the Nichrome wire) versus filament current is established and herein assumed as a requirement to be substantially met by the equalizer of the invention.

Figure 4A:
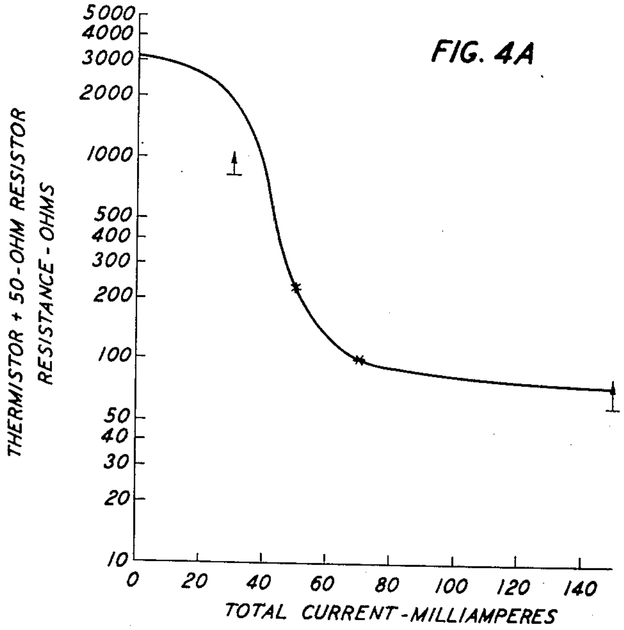
Fig. 4A is a graph of the desired resistance of the thermistor in series with 50 ohms as a function of the total current in the filament and its shunting varistor.
Figure 4B:
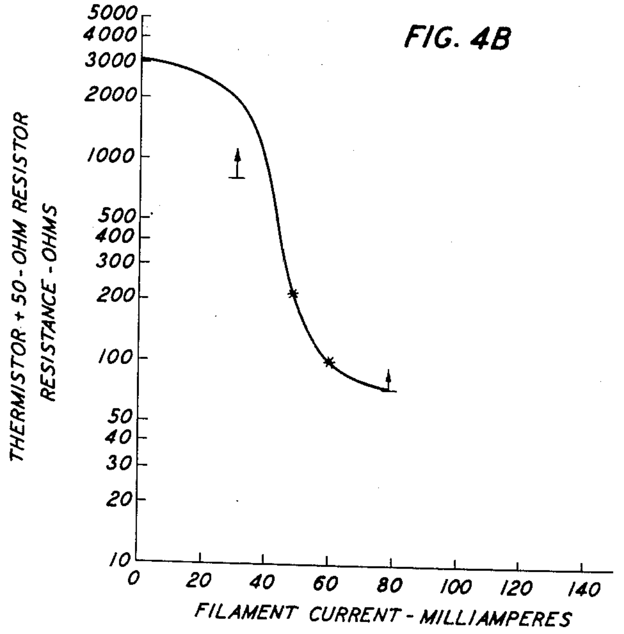
Fig. 4B is a graph of the desired resistance of the thermistor with 50 ohms in series as a function of the current in the filament only.

These requirements placed on the thermistor-plus-Nichrome wire resistance versus total current (filament plus silicon carbide varistor in parallel) and versus filament current above, are graphically shown in Figs. 4A and 4B, respectively. The individually specified points of the curve of Fig. 4A are tabulated as follows:

| Filament+varistor current, milliamperes | Thermistor+Nichrome wire resistance, ohms |
|---|---|
| 30 | 800 minimum. |
| 50 | 225. |
| 70 | 100. |
| 150 | 60 minimum. |

The like points of the curve of Fig. 4B are taken from the third column of the table earlier presented.

The desired resistances at specific filament current, or total current, values are indicated by crosses and arrows in Figs. 4A and 4B, in each of which the scale of resistance is logarithmic for convenience in plotting.

Referring again to Fig. 1, it will be apparent that the filament characteristic shown in Fig. 2 is dependent upon several independently selectable variables or parameters. These are: nature and pressure of the gas filling; diameter of filament wire; diameter of filament coils; spacing of turns and number thereof. Likewise a change in any one of these variables will be reflected in the thermistor characteristic shown in Fig. 4B. In addition, the thermistor characteristic will be altered, as will be demonstrated later, by the filament coils to thermistor spacing and the properties of the thermistor itself. The several parameters may be correlated, however, in accordance with principles involved in this invention to realize an optimum combination whereby the requirements indicated in Figs. 2 and 4B will be satisfied.

Figure 5:
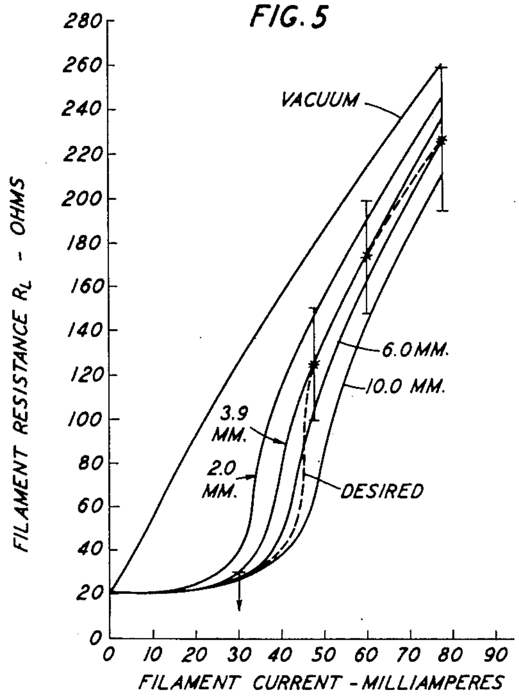
Fig. 5 shows a group of filament resistance versus filament current characteristics obtained in a particular equalizer as in Fig. 1 by merely altering the pressure of gas in the envelope.
Figure 6:
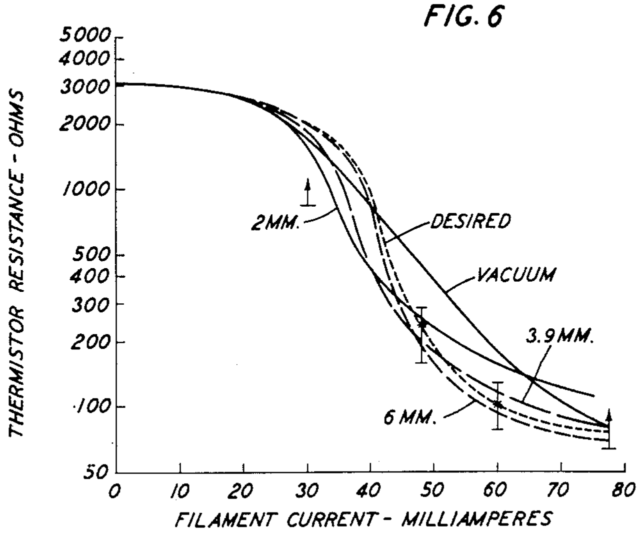
Fig. 6 shows a group of thermistor resistance versus filament current characteristics at various gas pressures in the same equalizer discussed in connection with Fig. 5.

The effect of changes in but one of these variables-gas pressure, is exhibited in Figs. 5 and 6, relating respectively to the filament and to the thermistor resistance as functions of filament current. On each of these figures, arrows and vertical bars indicate the tolerances within which it is required that the corresponding curves shall lie at the important values of filament current. It is apparent from Figs. 5 and 6 that, for the particular model tested, only two gas pressure conditions, namely 3.9 and 6.0 millimeters of mercury, satisfy all requirements. In this model the center of the thermistor bead was located 0.079 inch from the center of the filament coils.

From a number of observations made of thermistor resistance versus gas pressure at various filament currents and with various thermistor-to-coil spacings, it is found that for each spacing and each value of filament current, there is a gas pressure at which the thermistor resistance is a minimum, increasing but slowly as the pressure is varied either way from the minimum.

Figure 7:
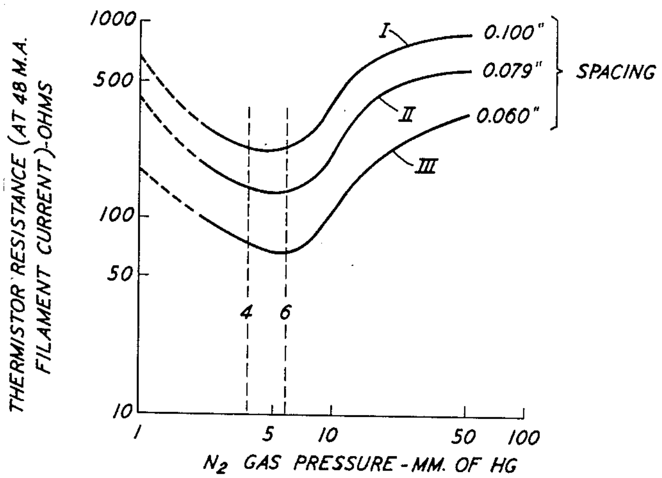
Fig. 7 shows a group of curves relating thermistor resistance to gas pressure, in a particular equalizer as in Fig. 1 and at a particular value of filament current, at various spacings between the thermistor and the filament coils.

Typical data yield the curves shown in Fig. 7. Here, curves I, II, and III relate to the fixed filament current of 48 milliamperes at coil-to-thermistor spacings of 0.100, 0.079, and 0.060 inch, respectively, at nitrogen pressures from about 2 to 50 millimeters of mercury. Both resistance and pressure are plotted logarithmically in Fig. 7. It is seen that for all three spacings, the resistance-pressure minima occur between 4 and 6 millimeters of mercury, moving toward higher resistance as the coil-to-thermistor spacing increases. At other values of filament current, it has been found that the resistance-pressure minima move toward lower or toward higher pressures as the filament current is lower or higher, respectively, than 48 milliamperes.

The curves of Fig. 7 have been plotted for the particular condition of 48 milliamperes filament current because it is in this region that the thermistor requirement is difficult to meet.

Another very significant factor that may be noticed from Fig. 7 is that the shape of the thermistor curve is alike for the three spacing conditions although the resistance level varies in accordance with the proximity of the thermistor to the filament. Thus the desired spacing may be calculated from such experimental data.

It also has been found judicious to manipulate the several variables so as to obtain the desired filament and thermistor characteristics in the region of the aforementioned uncritical gas pressure because the greatest manufacturing latitude occurs and the highest stability of characteristics is obtained.

In similar fashion the remaining variables must be studied and manipulated to obtain the optimum result. For instance, a finer diameter tungsten wire will provide a steeper portion in its characteristic at a somewhat higher gas pressure and will operate at a higher filament temperature at 18 volts. The latter effect, of course, is undesirable as the life of the apparatus will be shortened due to tungsten evaporation.

Likewise, the filament characteristic is altered considerably by changing the coil pitch, or spacing between turns, other factors being equal. As the coil is extended the active surface of the coil is increased and the filament is cooled more effectively by the gas and by radiation. Thus the more open pitch coil will assume a lower temperature and consequently a lower resistance than a more compactly wound coil for comparable filament currents.

Balancing all the considerations outlined and recalling that the steep portions of the curves of Figs. 5 and 6 occur in the region of 48 milliamperes filament current and the desired curves seem best met by nitrogen pressures in the region of 4 to 6 millimeters of mercury, one finds it particularly advantageous to design the equalizer substantially as described in connection with Fig. 1.

Figure 8:
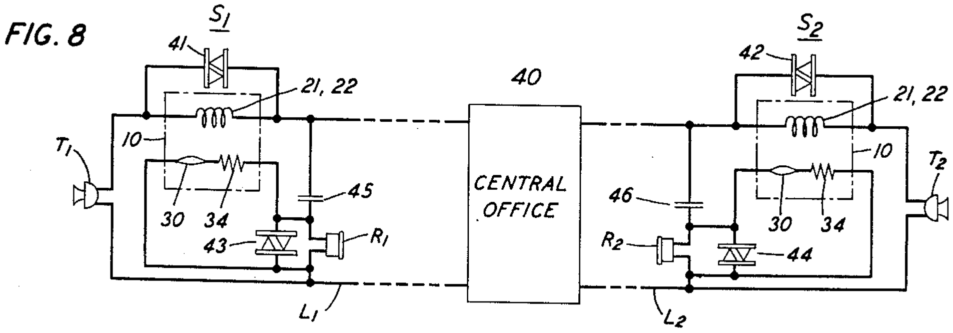
Fig. 8 is a schematic diagram, reduced to its simplest form, of a telephone transmission system employing the invention.

Fig. 8 is a schematic, omitting all elements not essential in the invention, of two telephone substations $S_1$ and $S_2$ connected by loops $L_1$ and $L_2$, $L_1$ being longer than $L_2$, through telephone central office 40. Transmitters $T_1$, $T_2$, and receivers $R_1$, $R_2$ are conventionally installed in the electrical connection to the corresponding loops. An equalizer, as in Fig. 1, is installed in each substation. Silicon carbide varistors 41, 42 shunt filament coils 21, 22 at stations $S_1$ and $S_2$, respectively, while receivers $R_1$ and $R_2$ are respectively shunted by copper oxide varistors 43 and 44. Direct current from the central office supplied through loops $L_1$ and $L_2$ traverses the equalizer filament and the transmitter at each station, while condensers 45, 46, respectively, admit to receivers $R_1$ and $R_2$ only the voice frequency component of this current modulated by a talker facing transmitter $T_1$ or $T_2$. Omitted from Fig. 8 are the usual conventional dialing, ringing, and anti-side tone elements of an actual station.

Figure 9:
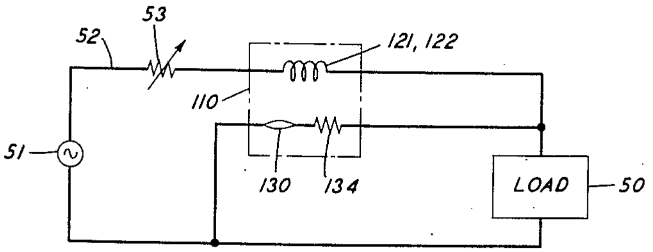
Fig. 9 is a similar diagram of a power transmission system regulated by an equalizer according to the invention.

Fig. 9 schematically indicates the application of the invention to the regulation of power supplied to a load device from source 51 through a transmission line 52 of variable resistance, symbolized by variable resistor 53. Source 51 is illustrated as an alternating-current generator; obviously, direct current is equally well controlled by an equalizer embodying the principle of the invention in envelope 110.

Equalizer envelope 110, with filament coils 121, 122 and thermistor 130 in series with fixed resistance 134, may differ in dimensions and carrying capacity from the model specifically described in connection with Figs. 1 through 8, but that model is functionally the same as the model required for the larger power to be controlled in the system of Fig. 9.

What is claimed is:

1. An equalizer for an electrical transmission line comprising an envelope containing an inert gas at a pressure lower than atmospheric, and having a pair of input and a pair of output terminals; a positive resistance-temperature coefficient conductor comprising two equal, elongated sections of coiled filament supported in spaced parallel relation in the envelope, and connected serially between the input terminals; and a body of high negative temperature coefficient material having leads extending oppositely therefrom, supported by said leads in the plane of said coiled wire sections, equidistant from said sections with the leads thereof parallel to said sections, and connected between the output terminals.

2. An equalizer as in claim 1 in which the envelope is a glass vessel and the inert gas is nitrogen at a pressure of approximately six millimeters of mercury.

3. An equalizer as in claim 2 including a fixed resistor having a low resistance-temperature coefficient, supported in the vessel and connected serially with the body of high negative resistance-temperature coefficient material between the output terminals.

NORMAN INSLEY.
THEODORE L. TANNER.

References Cited in the file of this patent

UNITED STATES PATENTS

| Number | Name | Date |
|---|---|---|
| 2,287,998 | Johnson | June 30, 1942 |
| 2,288,049 | Tillman et al. | June 30, 1942 |
| 2,344,298 | Green | Mar. 14, 1944 |
| 2,352,056 | Wilson | June 20, 1944 |
| 2,375,497 | Scully | May 8, 1945 |
| 2,386,903 | Lutomirski | Oct. 16, 1945 |
| 2,396,196 | Pearson | Mar. 5, 1946 |